May 6, 1958
J. C. WRIGHT
2,833,055
APPARATUS AND METHOD OF FLUIDIZED DRYING
OF CARBONACEOUS FUELS
Filed Nov. 10, 1954
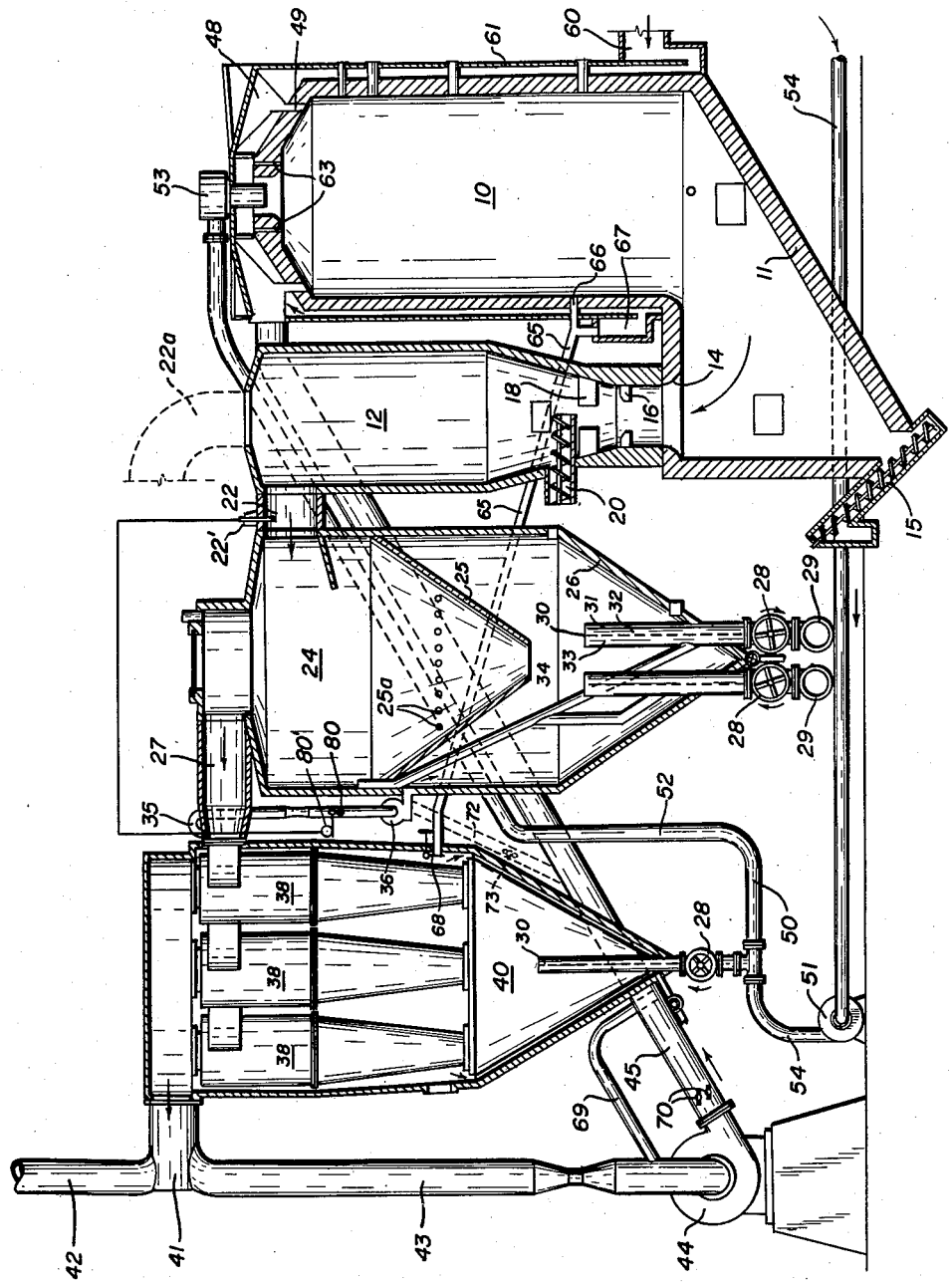
INVENTOR.
James C. Wright
BY
ATTORNEYS United States Patent Office 2,833,055
Patented May 6, 1958

2,833,055

APPARATUS AND METHOD OF FLUIDIZED DRYING OF CARBONACEOUS FUELS

James C. Wright, Denver, Colo., assignor to Silver Engineering Works, Inc., a division of Silver Corporation, Denver, Colo., a corporation of Colorado Application November 10, 1954, Serial No. 467,942

3 Claims. (Cl. 34—10)

This invention relates to a method and apparatus for the rapid and continuous drying of finely divided materials by direct heat exchange with hot gases of high velocity, commonly known as gas entrained drying. The process and apparatus relates more particularly to a method for providing a continuous process utilizing hot combustion gases for drying or vaporizing volatile ingredients from carbonaceous solids, including processes for drying low rank coals. The process of the invention is adapted to achieve results without substantial thermal decomposition of the carbonaceous fraction of the solids.

Low rank coal is very abundant throughout the United States, but the coal, generally, has a high percentage of mineral or inorganic substances, or extraneous ash. While this mineral matter, generally, is efficiently and easily removed by washing finely ground coal, the washed coal has a high percentage of moisture associated with it. The moisture content of washed coal varies considerably, due in part to a water film adhering to the surface of the individual particles, considered as surface moisture, and to internally held moisture or inherent moisture. Some coal, of course, has characteristically high inherent moisture content as mined, and the washing further increases the moisture content of the coal. The mineral content must be removed to make such coal usable for a great many purposes. The removal of moisture from the wet, demineralized coal, as far as is known to date, must be done by evaporization. Normal drying procedures have provided too costly for drying low rank coal. Gas entrained drying has, however, provided an economically feasible drying method.

The present invention provides among its objects and advantages means and methods for economically drying low rank carbonaceous fuels. The invention, also, includes means and methods for providing and controlling hot gases of combustion for direct heat exchange in drying solid material. The invention, further, provides means for utilizing a portion of the dried material as fuel for the furnace to heat the drying gases, and control means for supplying the correct amount of fuel to the furnace. The invention provides a clean and more efficient fuel as a product of the process of drying low rank coal, and the process utilizes the dust which is separated from the product. These and other objects and advantages of the present invention may be readily understood by referring to the following description and appended illustration.

The process, in general, provides for entraining finely divided coal in a high velocity moving stream of hot, substantially dry, gas. Wet particles are suspended in a high velocity stream of hot gas, and as the wet particles dry, they become lighter and the dry particles are entrained and carried along the flowing gas stream. The dried material, which includes dried coal dust, is separated from the spent gas. The present invention includes means and apparatus including a primary separator for efficiently separating dust and product from the spent gases. A portion of the separated spent gas is recycled into the separated dust and product to upset the separated solids so that the separator passes a portion of the dust along with the separated spent gases. The spent gases and entrained dust pass into a dust separator where the dust is separated from the spent gases. The separated dust is then resuspended in a gaseous medium for conveying to the furnace as fuel for generating the drying gases. The gaseous medium may be spent gas or air or a mixture of both. Under normal conditions, however, the gaseous medium will be substantially all fresh air. By regulating the amount of recycled spent gas entering the product bin of the primary separator, the fines or dust discharge may be selectively controlled, leaving a product in the separator which has a major quantity of the dust or fines removed and is, therefore, a more efficient fuel. The dust bin, which collects dust from the secondary or dust separator, is maintained in a substantially empty condition, that is, dust is not permitted to accumulate or pile up in the bin, by suspending the separated dust directly into a gaseous medium which is conveyed to the furnace. In this manner, only the amount of dust required for burning in the furnace is released from the product and dust in the primary separator, and a positive control is maintained on the apparatus.

The single figure of the drawing is a side elevational view, in partial section, of an assembly according to the invention including a drying chamber with the necessary equipment for the operation of the drying chamber.

A combustion furnace 10 generates hot gases from the combustion of fuel, and the hot gases are conveyed into a drying chamber 12. The hot gases of combustion from furnace 10 sweep downwardly against a bottom wall 11 and are reversed to enter the vertical drying chamber 12 through a throat 14 at the bottom thereof. As the hot combustion gases enter the drying chamber they are violently swirled by lower swirl vanes 16, and after passing through these swirl vanes 16, the gases are then substantially straightened by baffles 18. The swirl effect and the baffles establish a pressure and velocity equalization across the throat area of the drying column for the effective entrainment and even distribution of solids across the chamber. The swirling gases entrain carbonaceous fuel therein to prevent solids from passing through the throat and falling into the bottom of the furnace. The baffles 18, which provide a straightening effect, effectively suspend the solids in the high velocity gas. The individual particles of the solid being dried are dispersed and entrained in the rising gases whereby all their surfaces are brought into repeated and intimate contact with the high velocity hot gases. Feed means 20 introduces finely divided, wet coal or other carbonaceous fuel into the drying chamber directly above the baffle 18. As the wet material leaves the screw feed, it falls downwardly toward the baffle 18 and the vane 16. In general, the larger wet solids which may fall through the baffle 18 into the swirling gas are there dispersed, entrained and spread across the throat, the smaller lighter particles are entrained directly in the straightened gases leaving the baffles 18. The solids are thereby suspended in the hot gases in an entrained state and as the individual particles dry, they become lighter and are carried out of the drying chamber with spent drying gas. The dried particles are carried up through the chamber and out an outlet passage 22. Any ash, slag or solid products produced by the burning of the fuel in the furnace is effectively separated by the change of direction of the hot gases by contact with wall 11. The solid matter is removed from the furnace by a screw conveyor 15 at the bottom of the wall 11.

The dried solids and the substantially spent drying gases are separated by means of a primary separator 24, which is preferably a cyclone-type separator. The separator is designed to be very efficient in separating dried coal from the spent gases, including separating substantially all the dust and solids from the mixture exhausting from the drying chamber 12.

The solids which are separated in the primary cyclone separator 24 fall downwardly through a conical bottom 25 into a product bin 26 therebelow. The separated spent gas passes out of the separator through a top outlet 27. Dried product and entrained dust remains until withdrawn from the bin 26 by means of a pair of star feeders 28 delivering into pneumatic product lines 29. The star feeders are fed through a divided slotted pipe 30, which has a side slot 31 communicating with chamber 32 of the divided pipe. The other chamber 33 communicates with an exhaust 34 which exhausts to the atmosphere or into the top of the bin. Material in the bin is fed through the slot 31 into the chamber 32 and as the star feeder rotates, material falls from chamber 32 into a sector of the star feeder and gas from that sector exhausts back through chamber 33 and out through the exhaust 34. The individual sectors of the star feeder are thus filled completely as the feeder rotates, and the product is, thereby, readily withdrawn from the bin into pneumatic conveyors 29. As the dried product is of a relatively fine size, conventional star feeders tend to clog up and not discharge product due to the fact that there is no escape for gas from the individual sectors. The finely divided dried product packs quite readily, preventing the escape of gas through its mass. With a device according to the invention, the star feeders readily fill and positively withdraw the product from the feed bin.

In certain instances it may be desirable to exhaust dried solids and spent gas from the drier by means of an outlet extending directly from the center of the drier, indicated by dotted lines 22a. In such a case, the separator will be moved to register with the exhaust 22a from the drier 12.

A portion of the spent drying gases from the conduit 27 is by-passed through a conduit 35 back in the primary separator. The pressures in the duct 27 and on the conical bottom 25 are substantially equal, and a blower is necessary to provide excess pressure to upset the separated solids. The spent gas is propelled by means of a blower or fan 36 into the dried product bin on the underneath side of the conical bottom 25, to produce a pressure differential between the duct 27 and the bin which upsets the dust and dried product falling down the upper side of the cone 25. A damper or valve 80 controls the amount of gas returned to the primary separator. Gas ports 25a in the conical portion 25 aid in upsetting the dust and solids settling in the separator. The spent gases recycled back into the bin have an upsetting effect on the dust and product to selectively control fines or dust discharge from the primary separator. The resuspended dust passes out through the conduit 27 with the spent gases. The dust and spent gases then pass into dust separators 38, consisting of a series of small cyclone separators, which effectively remove dust from the spent gases. The dust falls from the separators 38 into a dust bin 40, and the spent gases flow out through an outlet conduit 41. Part of the spent drying gas is exhausted through an exhaust 42 to the atmosphere, and part is recycled through a conduit 43, passing through a blower 44, back into the furnace through a conduit 45. The recycled spent gases add volume to the products of combustion without adding additional oxygen, and aid in maintaining the temperature control of the gas exhausting from the furnace. The spent gas passing from conduit 45 enters a manifold 48 which feeds the furnace by means of inlet ports 49 spaced around the periphery of the furnace. The spent gas from the dust separator contains considerable heat, so it is valuable in providing preheated gases for balancing the temperature of the gases used for drying the wet coal.

Dust from the bin 40 is fed through a slotted, divided feed pipe 30 into a star feeder 28 and into a pneumatic line 50. A line or duct 54 passes through a blower 51 prior to picking up dust from the star feeder 28. The feed line 54 for the blower 51 may be connected to a source of fresh air (not shown), a source of spent gas (not shown) or, in the preferred form, a combination of both so that the composition of the gaseous medium for conveying dust to furnace may be controlled. The gaseous medium and dust passes through duct 50, into duct 52 and into burner 53 of the furnace 10. The amount of gas recycled into the primary separator 24 is controlled by a damper or valve 80, so that only as much dust is passed out of the primary separator 24 for subsequent conveyance in the gaseous medium as is required for combustion in the furnace for generating the hot drying gases. The dust which would settle and otherwise pile up in bin 40 is very difficult to withdraw at an even rate. Therefore, the bin is maintained in an empty condition, that is, the dust is withdrawn as fast as it settles in the bin 40. This maintains an even flow of dust from the bin, which is not possible where the dust is permitted to pile up in the bin.

Gaseous medium is blown from a blower or fan 51, into the pneumatic line 54 which is interconnected with the star feeder 28 on the dust bin 40. The medium passing through the duct 54 picks up the dust from the bin and conveys it along ducts 50 and 52 to the burner 53 for burning in the furnace. In the preferred form for a low rank coal drier, the gaseous medium is substantially all fresh air, but the ability to control the mixture of air and spent gas provides a greater measure of control of the system. This is especially valuable where explosive conditions are encountered. The temperature of the gas entering into throat 14 is used for resetting dampers 70 which control the amount of spent gas recycled into the furnace. The temperature of the gas exhausting through outlet 22 of the drier 12 is used to determine the amount of spent gas by-passed back into the separator to upset the product and pass the correct amount of dust required for combustion in the furnace. This may conveniently be done by arranging a temperature responsive means, such as a conventional thermostat 22', in the outlet 22 connected to a suitable control means, such as an actuating device 80', to actuate the control valve 80, or a similar actuator to operate control valve 73 or a suitable speed control means on the blower 36 for controlling the upsetting of the separated dried product in the main separator 24 as previously described. Primary air from a blower, not shown, is forced into a conduit 60, which passes around the furnace, and up the space between the furnace and a jacket 61 to the top thereof. The air passing up along the furnace wall is preheated, and it enters the furnace through ports 63 adjacent the burner 53 to provide oxygen for complete combustion of the dust passing through the burner 53.

Due to the fact that the spent gas contains a certain amount of moisture, a by-pass 65, which draws hot gases from the furnace through a port 66 and fresh warm air from a manifold 67, may be exhausted into the dust or secondary separator 38 to heat the same and prevent condensation of the moisture in the separator. The amount of hot gases conducted into the dust separators through the by-pass 65 is controlled by means of a valve or damper 68. The by-passed gases pass down along the outside of the bin 40 and are withdrawn through a conduit 69 which exhausts into conduit 43 entering the blower 44 for return to the furnace. The by-pass 65 is especially valuable in starting up the device to prevent condensation of moisture in the dust separator and prevent a wet dust therein.

The spent gas being recycled into the furnace 10 through conduit 45 is controlled by means of the pair of butterfly valves or dampers 70 adjacent the blower 44. The amount of spent gas being passed back into the furnace is controlled by the temperature of the drying gas issuing from the furnace and passing into the drying chamber. In certain installations, it may be desirable to include a by-pass 72, shown in dashed lines, from conduit 45 into blower 36, or directly into the primary separator 24, for recycling spent gas from the conduit 45 rather than recycling spent gas through by-pass 35. The pressure in duct 45 is greater than the separator 24, so that no blower may be necessary. The by-pass 72 may be readily controlled by means of a valve or damper 73. In either case, whether the gas is by-passed through by-pass 35 or the by-pass 72, the spent gas is utilized to upset the action of the cyclone separator sufficiently to resuspend dust into the out-going spent gas. The amount of spent gas by-passed back into the separator determines the amount of dust resuspended for subsequent conveyance to the furnace for burning and generating the gases of the combustion.

The system of the invention provides means for drying finely divided wet carbonaceous fuels, and for utilizing the dust of the finely divided dried product to generate hot drying gases for continuing the drying process. By controlling the amount of dust being conveyed to the combustion furnace, the system is readily controllable. Since coal dust is difficult to handle under the best conditions, the system provides for ease of handling and control of the dust, and provides an economical system for using the dust and a clean, more efficient product. A minor amount of dust which is not required for combustion passes out of the system with the product. The gas recycled back into the primary separator is easily and quickly controlled to provide the requisite amount of dust for the combustion.

The primary separator with the recycled gases provides a fundamental change in separator design, in that the separator efficiency may be controlled. Not only may the efficiency of the separator be controlled, but dust and fines may be selectively removed from dried fuel. The dust and fines provide an efficient heating material, and the dust free fuel is a more desirable product. The amount of gas recycled into the primary separator varies the efficiency of the unit by selectively passing dust and fines. The controlled efficiency of the separator controls not merely the quantity of solid removed from gas but it controls the quality of products.

The efficiency of the separator is controlled by recycling a predetermined amount of separated gas into the settling solids which have been separated from the mixture of suspended solids in the gas stream. A predetermined amount of dust and fines may thus be removed from the separated product, and the efficiency of the separator is controlled for the desired operation. A series of separators may be used to classify finely divided solids in a gas stream by controlling the efficiency of the individual separator to obtain a specific product. The recycled gas provides a positive, fast acting means for controlling the efficiency of the separators.

While the invention has been described by reference to a specific embodiment, there is no intent to limit the invention to the precise details set forth, except insofar as defined by the following claims.

I claim:

1. A drier system having a furnace for generating drying gases, a drying chamber connected to said furnace for receiving said drying gases, means for supplying wet combustible solids to said drying chamber in the path of said drying gases, means for passing the gases generated in said furnace at a high velocity to said drying chamber whereby said wet solids are entrained in the high velocity drying gas from said furnace and dried solids entrained in the drying gas are exhausted from said chamber, said drying chamber having an exhaust, main means connected to said drying chamber exhaust for separating substantially all of the gas entrained dried solids from the mixture of entraining gas and dried solids discharged from said drying chamber, means connected to said main separating means to supply a stream of gas into the separated solids for upsetting the solids separated in said main separating means whereby finer dust of said separated solids is resuspended in the gas and exhausted therewith from said main separating means, means for separating the resuspended dust from the gas exhausted from said main separating means, means supplying a gaseous medium to said separated dust to resuspend said dust substantially immediately after it has been separated and conveying said dust to said furnace as fuel, control means for said upsetting means, and control means responsive to the temperature of entraining gas exhausted from said drying chamber to actuate said control means operable to control said upsetting means to provide the quantity of resuspended dust as required for fuel for generating the required drying gas by said furnace.

2. A drier system having a furnace for generating drying gases, a drying chamber connected to said furnace for receiving said drying gases, means for supplying wet combustible solids to said drying chamber in the path of said drying gases, means for passing the gases generated in said furnace at a high velocity to said drying chamber whereby said wet solids are entrained in the high velocity drying gas from said furnace and dried solids entrained in drying gas are exhausted from said chamber, said drying chamber having an exhaust, main means connected to said drying chamber exhaust for separating substantially all of the gas entrained dried solids from the mixture of entraining gas and dried solids discharged from said drying chamber, said main separating means having an exhaust outlet, means connected to said main separating means exhaust outlet and to said main separating means to supply a stream of gas from said outlet into the separated solids for upsetting the solids separated in said main separating means whereby finer dust of said separated solids is resuspended in the gas and exhausted therewith from said main separating means, means for separating the resuspended dust from the gas exhausted from said main separating means, means supplying a gaseous medium to said separated dust to resuspend said dust substantially immediately after it has been separated and conveying said dust to said furnace as fuel, control means for said upsetting means, and control means responsive to the temperature of entraining gas exhausted from said drying chamber to actuate said control means operable to control said upsetting means to provide the quantity of resuspended dust as required for fuel for generating the required drying gas by said furnace.

3. The method of controlling a drier having a furnace for generating drying gases and a drying chamber for drying wet combustible solids by gas entrained suspension in a moving stream of heated drying gases which comprises, separating gas entrained dried product from the entraining drying gas exhausted from said drying chamber, recycling a portion of entraining drying gas exhausted from the drying chamber into said separated dried product for resuspending and removing a quantity of finer dust in said dried product for fuel for the furnace, said portion being controlled in proportion to the amount of fuel required by the furnace, and separating the resuspended dust from the entraining gas and passing said dust substantially simultaneously as it is separated for delivery into said furnace.

References Cited in the file of this patent
UNITED STATES PATENTS

| | | |
|---|---|---|
| 1,675,941 | Lindsay | July 3, 1928 |
| 1,756,960 | Stebbins | May 6, 1930 |
| 2,211,274 | Kuck | Aug. 13, 1940 |
| 2,638,684 | Jukkola | May 19, 1953 |
| 2,666,269 | Parry | Jan. 19, 1954 |